(12) United States Patent
Blatstein et al.

(10) Patent No.: US 10,676,009 B2
(45) Date of Patent: *Jun. 9, 2020

(54) TRANSPORTABLE MODULAR SYSTEM FOR DISPENSING AND BOXING FOOD AND BEVERAGE ITEMS

(71) Applicant: OTG Experience, LLC, New York, NY (US)

(72) Inventors: Eric J. Blatstein, New York, NY (US); Ronald M. Falocco, New York, NY (US); Thomas A. Hillerich, Jr., Louisville, KY (US); Gabriel A. Difurio, Stevenson, MD (US)

(73) Assignee: OTG Experience, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,785

(22) Filed: Apr. 3, 2018

(65) Prior Publication Data

US 2018/0222374 A1    Aug. 9, 2018

Related U.S. Application Data

(62) Division of application No. 14/827,772, filed on Aug. 17, 2015, now Pat. No. 9,963,061, which is a division
(Continued)

(51) Int. Cl.
*B65G 1/00* (2006.01)
*B60P 3/025* (2006.01)
(Continued)

(52) U.S. Cl.
CPC .............. *B60P 3/0257* (2013.01); *B60P 1/36* (2013.01); *B60P 1/6427* (2013.01); *B60P 3/055* (2013.01);
(Continued)

(58) Field of Classification Search
CPC .......... G07F 11/60; G07F 11/58; G07F 11/54; G07F 11/50
(Continued)

(56) References Cited

U.S. PATENT DOCUMENTS 2,299,347 A    10/1942  Rifkin
2,512,684 A *   6/1950  Shontz, Jr. .............. G07F 11/58
                                                    221/281

(Continued)

FOREIGN PATENT DOCUMENTS

CN    201214554 Y    4/2009
CN    103738640 A    4/2014
CN    103771158 A    5/2014

*Primary Examiner* — Timothy R Waggoner
(74) *Attorney, Agent, or Firm* — BakerHostetler

(57) ABSTRACT

A transportable system for dispensing and boxing items is mounted to and enclosed by a truck. The system comprises at least two dispensing carts. Each cart includes a body, a set of wheels disposed on a bottom surface of the body, a set of bearings disposed on the top surface of the body, and an outlet defined by the body. At least one of the at least two dispensing carts is adapted to store a first set of items vertically and dispense the first set of items using an unpowered escapement and at least another one of the dispensing carts is adapted to store items horizontally. The system further comprises a box dispenser configured to dispense boxes and a conveyor system disposed beneath the outlets of the at least two dispensing carts. The conveyor system defines a continuous path for boxes from the box dispenser to an end location.

10 Claims, 13 Drawing Sheets

Related U.S. Application Data of application No. 14/449,597, filed on Aug. 1, 2014, now Pat. No. 9,114,748.

(51) Int. Cl.

| | | |
|---|---|---|
| *B65G 57/30* | (2006.01) | |
| *B65G 1/137* | (2006.01) | |
| *B60P 1/36* | (2006.01) | |
| *B60P 1/64* | (2006.01) | |
| *B60P 3/055* | (2006.01) | |
| *B65G 47/51* | (2006.01) | |
| *G06Q 10/08* | (2012.01) | |

(52) U.S. Cl.
CPC ......... *B65G 1/1373* (2013.01); *B65G 1/1376* (2013.01); *B65G 47/5154* (2013.01); *B65G 57/307* (2013.01); *B62B 2202/67* (2013.01); *G06Q 10/0875* (2013.01)

(58) Field of Classification Search
USPC .................................................. 221/121, 122
See application file for complete search history.

(56) References Cited

U.S. PATENT DOCUMENTS

| | | | |
|---|---|---|---|
| 3,625,397 A | 12/1971 | Shelly | |
| 3,719,288 A | 3/1973 | Johnson | |
| 3,751,101 A | 8/1973 | Miller et al. | |
| 3,877,744 A | 4/1975 | Miller | |
| 3,883,038 A | 5/1975 | Bookout | |
| 4,009,792 A * | 3/1977 | Sano | B60P 1/52 414/499 |
| 4,354,614 A | 10/1982 | Bookout | |
| 4,542,808 A | 9/1985 | Lloyd, Jr. et al. | |
| 4,886,286 A | 12/1989 | Whorton, III | |
| 5,076,751 A * | 12/1991 | Kafka | B65H 19/126 414/282 |
| 5,163,806 A | 11/1992 | Robertson et al. | |
| 5,205,515 A | 4/1993 | Luria | |
| 5,261,187 A | 11/1993 | Prenger | |
| 5,271,703 A | 12/1993 | Lindqvist et al. | |
| 5,286,103 A | 2/1994 | Price, Jr. et al. | |
| 6,064,921 A | 5/2000 | Pippin et al. | |
| 6,247,890 B1 | 6/2001 | Chang et al. | |
| 7,401,710 B2 * | 7/2008 | Black, Jr. | G07F 11/04 221/115 |
| 8,302,783 B1 | 11/2012 | Harris et al. | |
| 8,360,447 B2 | 1/2013 | Knoppers | |
| 8,556,084 B1 | 10/2013 | Snook | |
| 8,596,654 B2 | 12/2013 | Belanger et al. | |
| 8,690,170 B2 | 4/2014 | Belanger et al. | |
| 9,240,007 B2 * | 1/2016 | Barragan Trevino | G06Q 20/322 |
| 2001/0010419 A1 | 8/2001 | Kasuya | |
| 2003/0233814 A1 | 12/2003 | Ng et al. | |
| 2005/0218615 A1 | 10/2005 | Hu | |
| 2006/0049198 A1 | 3/2006 | Guard | |
| 2006/0108757 A1 | 5/2006 | Brookmire et al. | |
| 2007/0163133 A1 | 7/2007 | Yuyama et al. | |
| 2008/0159843 A1 | 7/2008 | Yuyama et al. | |
| 2008/0319574 A1 | 12/2008 | Wilke | |
| 2010/0140890 A1 | 6/2010 | Boivin et al. | |
| 2012/0029691 A1 | 2/2012 | Mockus et al. | |
| 2012/0031686 A1 | 2/2012 | Ferrigni | |
| 2013/0186044 A1 | 7/2013 | Cremer | |
| 2013/0241165 A1 | 9/2013 | Boivin et al. | |
| 2013/0297066 A1 | 11/2013 | Alvern | |
| 2015/0041100 A1 | 2/2015 | Huang et al. | |
| 2015/0057796 A1 | 2/2015 | Boodaghians | |
| 2015/0059363 A1 | 3/2015 | Burd et al. | |

\* cited by examiner

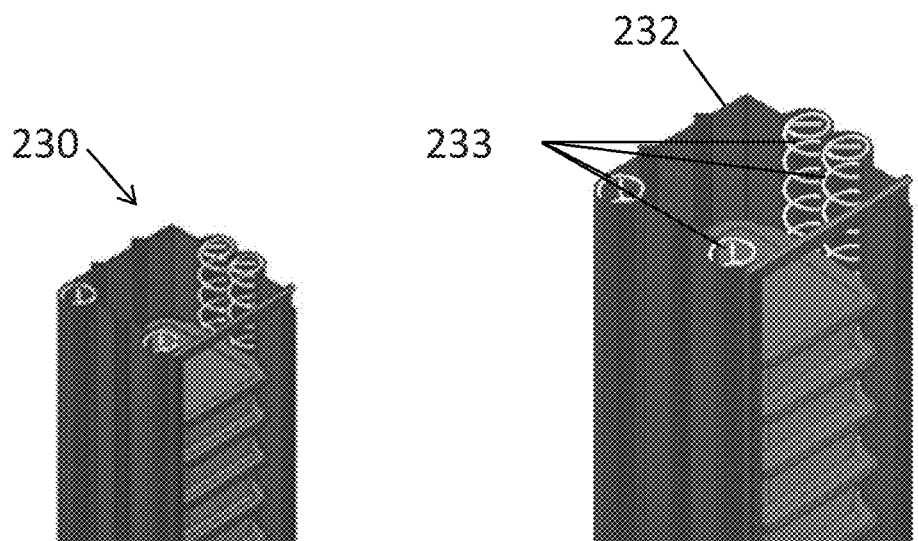
Fig. 10B
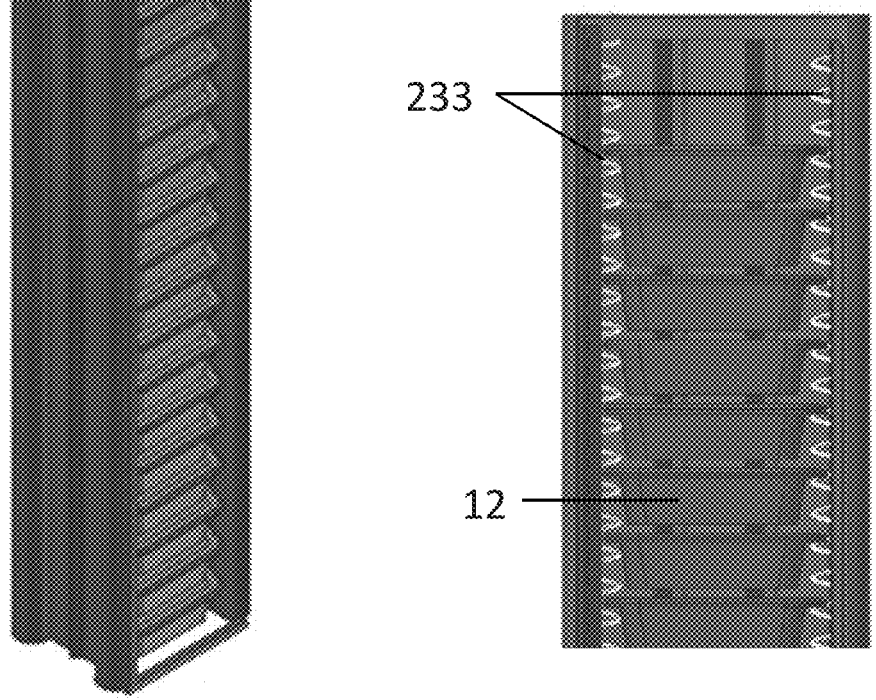
Fig. 10C
Fig. 10A

US 10,676,009 B2

TRANSPORTABLE MODULAR SYSTEM FOR DISPENSING AND BOXING FOOD AND BEVERAGE ITEMS

CROSS-REFERENCE TO RELATED APPLICATIONS

This is a divisional application of U.S. patent application Ser. No. 14/827,772, filed Aug. 17, 2015, which is a divisional application of U.S. patent application Ser. No. 14/449,597, filed Aug. 1, 2014, the disclosures of which are hereby incorporated by reference as if set forth in their entirety herein.

BACKGROUND

Conventional food delivery systems for airplane passengers prepackage predetermined orders into discrete packages that, once on the plane, are selected by passengers. For example, after boarding an airplane, a passenger will be given a choice between a vegetarian meal and a standard meal. While these systems minimized time requirements for reloading an airplane prior to a flight, they have several drawbacks, including the inability to handle customized food orders, possibly inaccuracy of matching a passenger's choices to the available food or beverage, and the like. Beyond providing a choice to passengers of two or three preset orders, individually customized food orders, such as those selected by the passenger prior to boarding an airplane, were not considered possible by the food delivery industry.

SUMMARY

According to an aspect of the present invention, a system is provided that enables a customer to select from several food and beverage choices, and the system diminishes the time required to rapidly provide a package having the selected food and beverage to a predetermined location, such as a commercial airplane, in a time-sensitive environment.

In one configuration, a transportable system for dispensing and boxing items is mounted to and enclosed by a truck. The system comprises at least two dispensing carts. Each cart includes a body, a set of wheels disposed on a bottom surface of the body, a set of bearings disposed on the top surface of the body, and an outlet defined by the body. At least one of the at least two dispensing carts is adapted to store a first set of items vertically and dispense the first set of items using an unpowered escapement and at least another one of the at least two dispensing carts is adapted to store items horizontally. The system further comprises a box dispenser configured to dispense boxes and a conveyor system disposed beneath the outlets of the at least two dispensing carts. The conveyor system defines a continuous path for boxes from the box dispenser to an end location.

In another configuration, a transportable cart for storing items comprises a body, a set of wheels disposed on a bottom surface of the body, a set of bearings disposed on the top surface of the body, an outlet defined by the body, and an escapement. The escapement is configured to control passage of items from an interior of the body through the outlet, and includes jaws and a linkage. The linkage includes an interface for engaging an actuator that has a power source that is not connected to the transportable cart.

In yet another configuration, a method of dispensing and boxing items using a transportable system that is mounted to and enclosed by a truck comprises a step of dispensing a box from a box dispenser onto a conveyor system. The method further comprises a step of conveying the box from the box dispenser to at least two dispensing carts using a conveyor belt of the conveyer system. The conveyor system is disposed beneath the at least two dispensing carts and defines a continuous path for the box from the box dispenser to an end location. The method also includes a step of dispensing a first item from a first dispensing cart. The first dispensing cart includes a body, a set of wheels disposed on a bottom surface of the body, a set of bearings disposed on the top surface of the body, and an outlet defined by the body. The first dispensing cart is adapted to store a first set of items vertically. The step of dispensing the first item includes actuating an escapement to release the item through the outlet. The method also includes a step of dispensing a second item from a second dispensing cart. The second dispensing cart is adapted to store items horizontally.

BRIEF DESCRIPTION OF THE FIGURES

FIG. 1 is a schematic representation of a transportable system for dispensing and boxing items, including a truck in which the system is mounted to and enclosed by;

FIG. 10A is a portion of the transportable system shown in FIGS. 1-3, showing a fourth dispensing cart;

FIG. 10B is a portion of the fourth dispensing cart shown in FIG. 10A;

FIG. 10C is a portion of the fourth dispensing cart shown in FIGS. 10A and 10B;

DETAILED DESCRIPTION OF PREFERRED EMBODIMENTS

Figure 1:
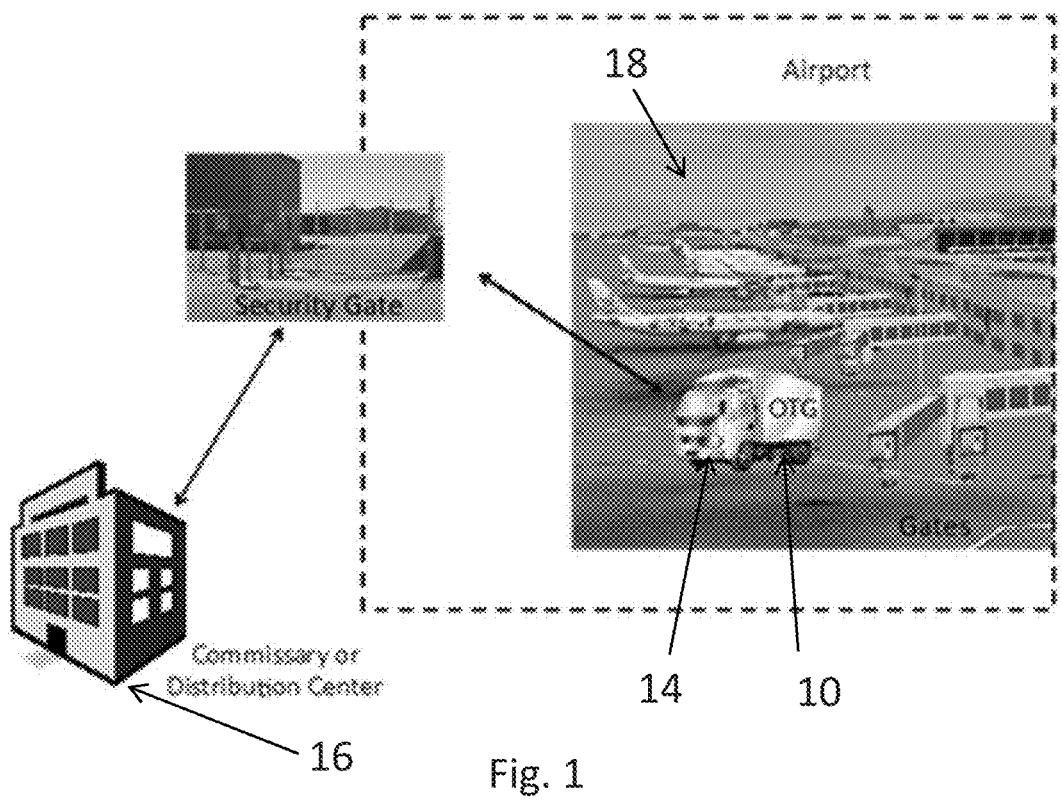

FIG. 1 illustrates a schematic representation of a mobile order delivery system 10 for receiving individual orders for items 12, such as pre-packaged food, beverage, and (optionally) small non-food items from multiple customers, dispensing boxes onto a conveyor system, dispensing each individual choice of items for each order into a corresponding box, identifying the box as corresponding to the particular order, and dispensing the filled boxes. Order delivery system 10 is configured to dispense and box items 12 (shown in FIGS. 5B, 6A, 6B, 8, 12, and 15) for consumption and/or use by customers, such as airplane passengers. For example, items 12 may include food, such as salads, sandwiches, wraps, and/or chips. Alternatively, items 12 may include non-food items, such as headphones, earplugs, and/or eye masks.

Mobile order delivery system 10 is mounted to and enclosed by a truck 14. Truck 14 is configured to include a conveyor system 60, as described more fully below, in a pattern such that boxes 20 are conveyed to a predetermined position under carts 30, 30', 130 which house items 12. The internal space within truck 14 is configured such that carts 30, 30', 130 can be loaded with items 12 at a distribution center 16, such as a commissary. Carts 30, 30', 130 after loading are rolled or otherwise loaded into the internal space of truck 14 and registered into predetermined locations relative to conveyors 60.

Truck 14 then travels to a service point 18, such as an airport gate to meet a commercial airliner that is being readied for an outbound flight. While travelling, or while stationed at service point 18, mobile order delivery system 10 dispenses items 12 into boxes 20 (shown in FIGS. 3, 4, 8, 14 and 15). Boxes 20 are then removed from the truck 14 and delivered for consumption and/or use by the customers based on identification information on each box. For example, boxes 20 may be delivered to a customer's assigned seat on an airplane.

Figure 2:
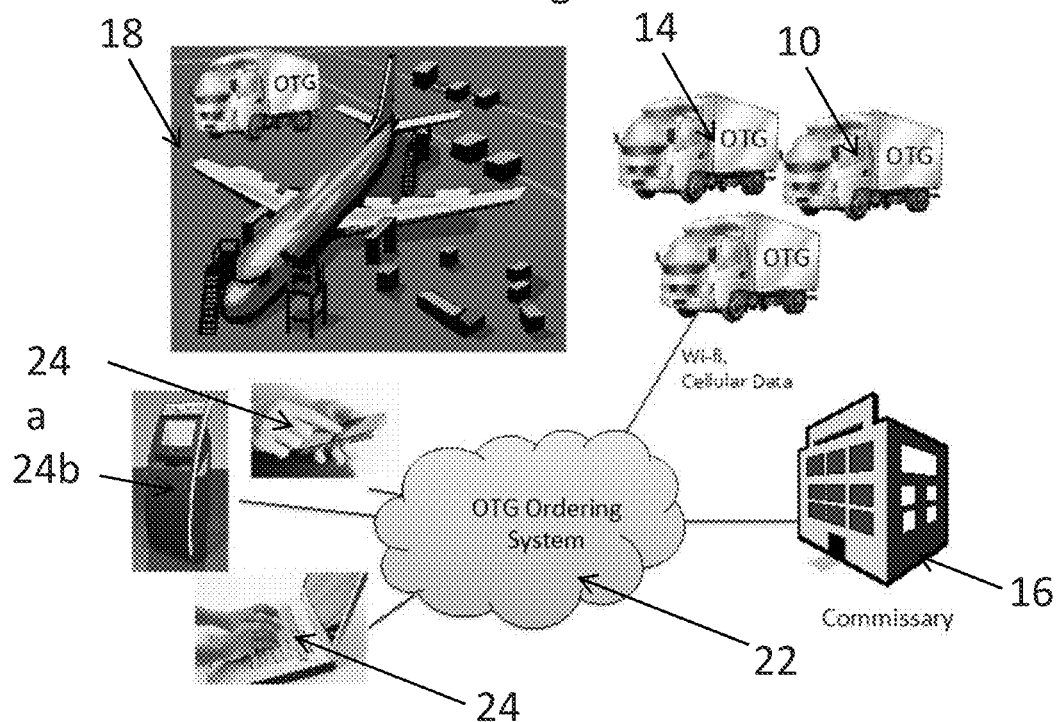
FIG. 2 is a schematic representation of the transportable system shown in FIG. 1.

The contents of boxes 20 are customizable according to a customer's choices in the customer's order. For example, with reference to FIG. 2, the customer may order specific items 12 for delivery to his/her assigned seat. The customer may place a customized order prior to his/her scheduled flight using an ordering system via the cloud 22. The customer may access the cloud 22 using a communication device 24, such as a personal communication device 24a or a public computing device 24b. For example, communication device 24 may be the same device that the customer uses to check in for his/her flight, a tablet device that is part of an ordering system in an airport restaurant, a smartphone, tablet, or other wireless communication device owned by the customer, or the like. Information entered on the ordering system by the customer may be accessed by the distribution center 16 and/or (optionally mobile order delivery system 10 on truck 14 and/or so that mobile order delivery system 10 is able to dispense and box items 12 according to the customer's customized order.

Figure 3:
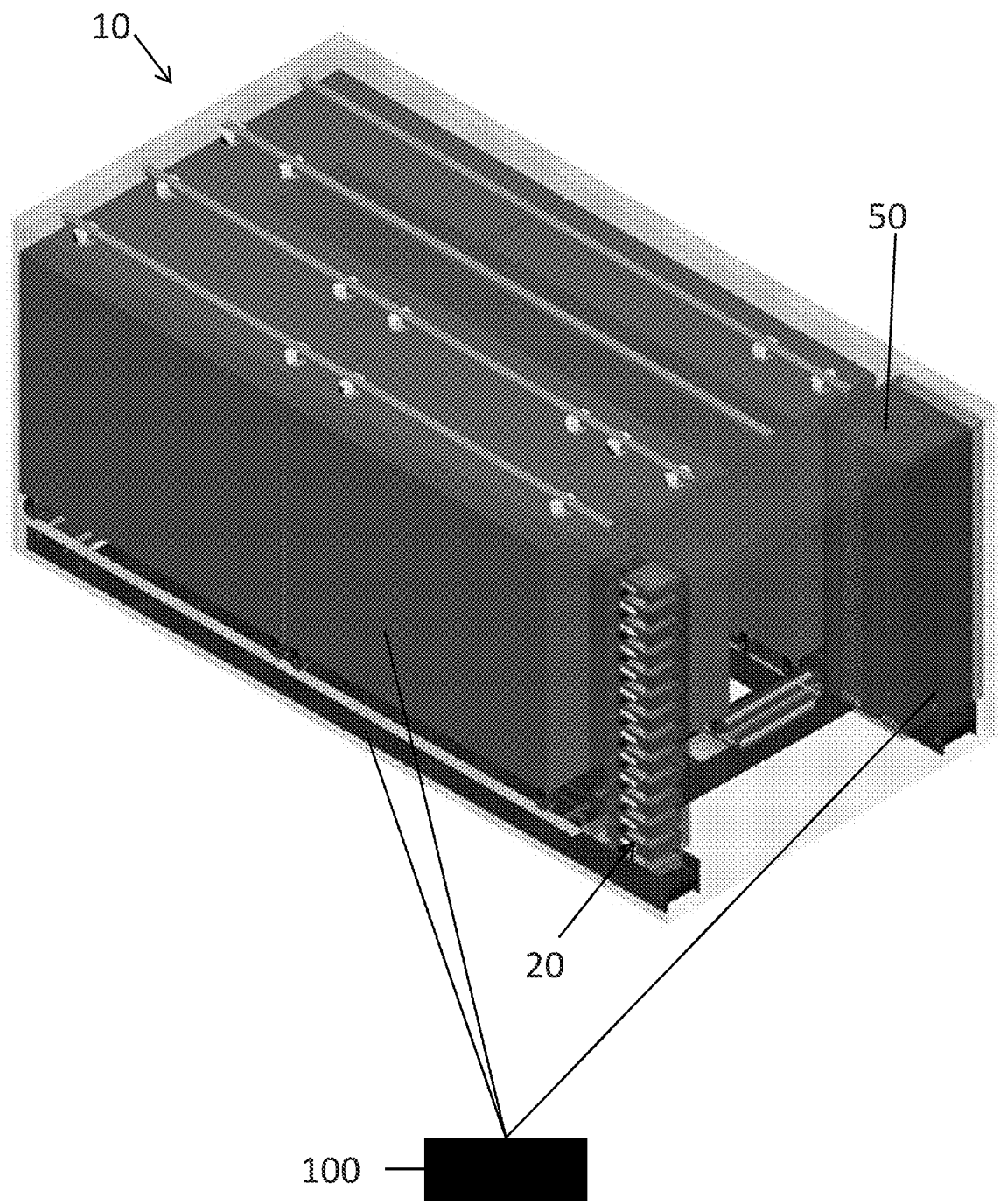
FIG. 3 is the transportable system shown in FIGS. 1 and 2, showing dispensing carts, a box dispenser, boxes, and a conveyor system.

With reference now to FIG. 3, mobile order delivery system 10 fulfills individualized orders by selectively dispensing items 12 from dispensing carts 30 into boxes 20 as the boxes move from a box dispenser 50 to an end location 70 along a conveyor system 60. In this regard, mobile order delivery system 10 is controlled by control system 100 that coordinates actuation of dispensing carts 30, box dispenser 50, and conveyor system 60. Control system 100 is connected to the ordering system via the cloud 22.

Figure 5A:
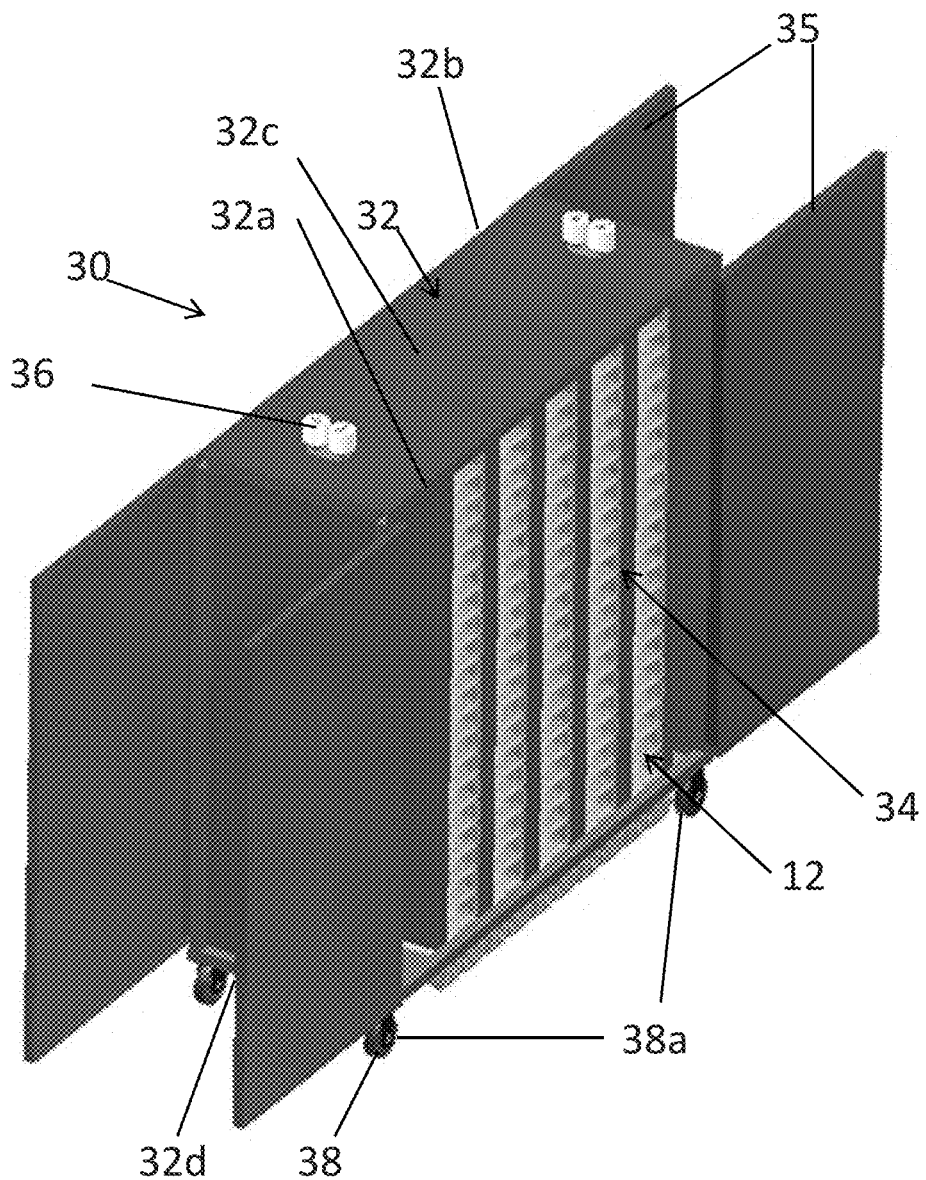
FIG. 5A is a portion of the transportable system shown in FIGS. 1-3, showing a first dispensing cart.

An exemplary dispensing cart 30 is shown in FIG. 5A with items 12 stacked vertically. Cart 30 includes a body 32 having a frame 34 that supports items 12 in the vertically stacked configuration. Cart 30 further includes doors 35 disposed on the front surface 32a and the rear surface 32b of the body 32. Doors 35 provide access to an interior of body 32 in order to restock items 12.

Cart 30 has a guide system, such as a set of rollers 36, disposed on a top surface 32c of the body 32. Rollers 36 may be casters that are fixed to the top surface 32c by rivets. Rollers 36 are configured to mate with at least one top rail 80 (shown in FIG. 4) that is fixed to truck 14. For example, rollers 36 have a generally cylindrical shape and spin freely about rivets attached to the cart. Top rail 80 defines a recess configured to fit rollers 36 such that rollers 36 can freely spin within the recess of the rail, while lateral movement of the cart 30 is minimized by the rail. The present invention is not intended to be limited to any particular guide system, but rather encompasses a system in which rollers are located on the truck for guiding a rail on the top of the cart, or any other type of guidance and registrations system, including sliders, V-grooves, channels, and the like.

Cart 30 also has a set of wheels 38 disposed on a bottom surface 32d of the body 32. For example, the set of wheels 38 may include four wheels, at least two of which each have a groove 38a. FIG. 5A depicts that the front two wheels of cart 30 have a registration system, such as a groove 38a. Grooved wheels 38 are configured to mate with at least one bottom rail 82 (shown in FIG. 4) that is fixed to the truck. For example, wheels 38 define a V-shaped groove that matches a V-shaped protrusion on bottom rail 82 such that the V-shaped groove on the wheel 38 rotates along the V-shaped protrusion on the rail 82. The interface of the V-shaped groove and the V-shaped protrusions minimizes lateral movement of the cart 30. While each wheel of the set of wheels 38 may include a groove 38a, some of the wheels may be flat (i.e., not including a groove). For example, FIG. 5A depicts that the rear two wheels 38 of cart 30 are flat. Flat wheels 38 are configured to roll against surface 84 affixed to the truck 14 and configured to correspond to the flat wheels. In this regard, the wheels 38 and cooperating structure in truck form a registration system. The present invention is not limited the registration system disclosed herein, but rather encompasses any structure and combination of structure.

In this regard, the guide system on the top of the cart and the registration system on the bottom of the cart enable registration of cart 30 into a predetermined position in truck 14 relative to conveyor 60. Other guidance and registration systems are contemplated.

Figure 5B:
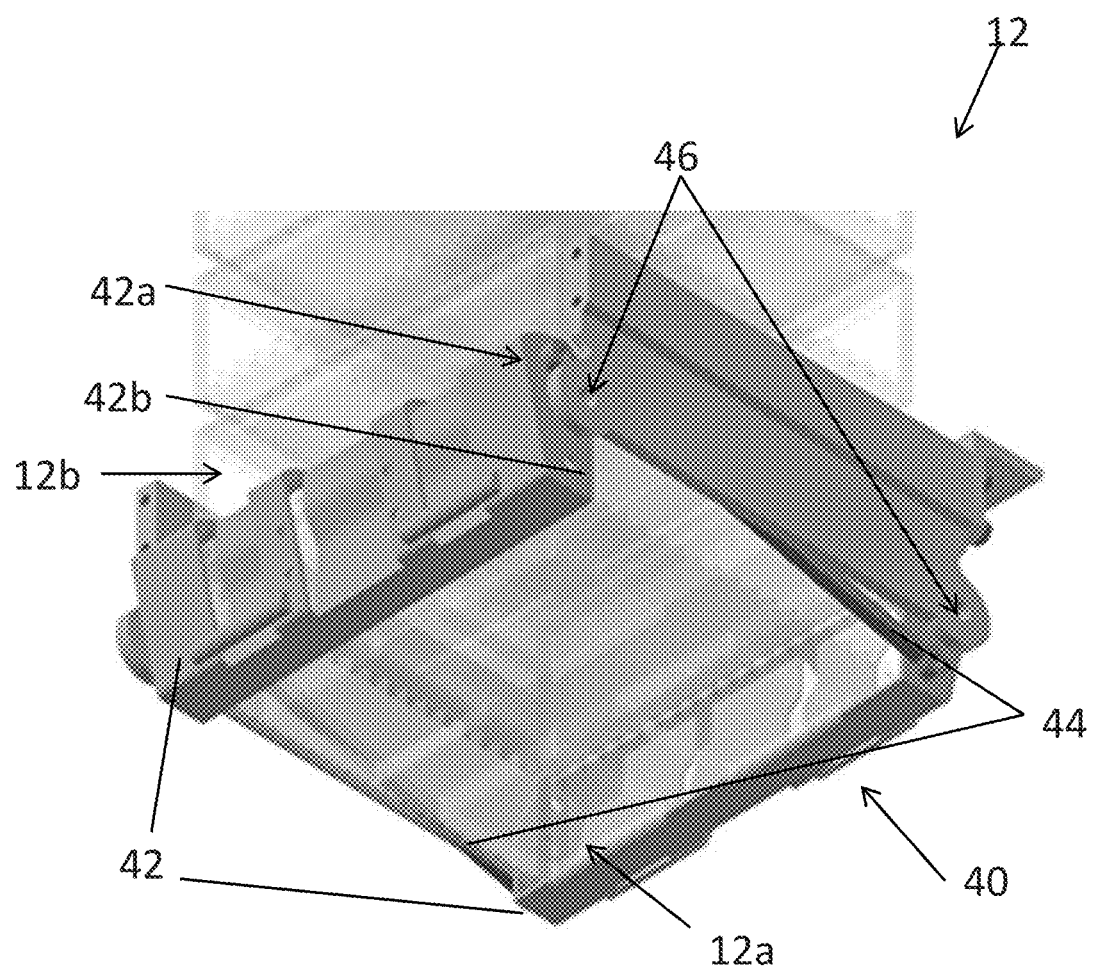
FIG. 5B is a portion of the dispensing cart shown in FIG. 5, showing an escapement.

With reference to FIG. 5B, dispensing cart 30 further comprises an escapement 40 disposed the bottom surface 32d of the body and configured to iteratively release items 12 from the cart 30. The term "escapement" as used in this disclosure refers to a mechanical mechanism that is controlled to release one item at a time from a vertical stack of items. The escapement 40 includes jaws 42 that each rotate about a pivot 46 and have an upper portion 42a and a lower portion 42b. Jaws 42 are connected to each other by at least one linkage 44. Linkage 44 includes an interface for engaging an actuator (not shown), such as an linear actuator.

As illustrated in FIG. 5B, cart 30 holds prepackaged items having a flat bottom, such as boxed items. When dispensing an item 12, the actuator engages the linkage 44 so as to rotate the jaws 42. For example, if only one actuator is used, linkage 44 keeps the both jaws 42 timed so that one rotates about pivot 46 before the other. Prior to actuation of the linkage 44, the bottom item 12 of the stack of items is retained both a first side 12a and a second side 12b opposite the first side 12a. When the linkage 44 is activated, the lower portion 42b of each jaw 42 sequentially pivots outward, away from item 12, such that the first side 12a and then the second side 12b of item 12 is released and the bottom item 12 is released from the stack.

As the lower portions 42b of jaws 42 rotate outward about pivot 46, upper portions 42a of the jaws 42 engage and support the item 12 that is above the bottom item 12 being released so as to temporarily support the remaining stack. When the actuator is de-energized the jaws rotate to their original position, supporting the remaining items in the stack. In this way, the actuator functions to dispense one item 12 at a time using a two-position linear actuator. The rotation of the jaws 42 may be sufficiently quick such that the lower portions 42b of the jaws 42 rotate into position to catch and support the stack of items 12 such that the new bottom item 12 is in the position that was previously occupied by the dispensed item 12.

Preferably, cart 30 is not powered and does not have an actuator to operate escapement 40. Rather, the actuator for cart 30 preferably is installed within truck 14 and powered by an electric, hydraulic, or pneumatic system of truck 14. For example, linear actuators may be oriented such that the moving element of the linear actuator moves up and down. The escapement will be positioned above the linear actuator such that when the linear actuator is energized, the moving element will move up and engage the escapement jaws 42. When the linear actuator is de-energized the moving element will retract downward away from the escapement. Alternatively, a portion of conveyor system 60 may actuate escapement 40.

Figure 6A:
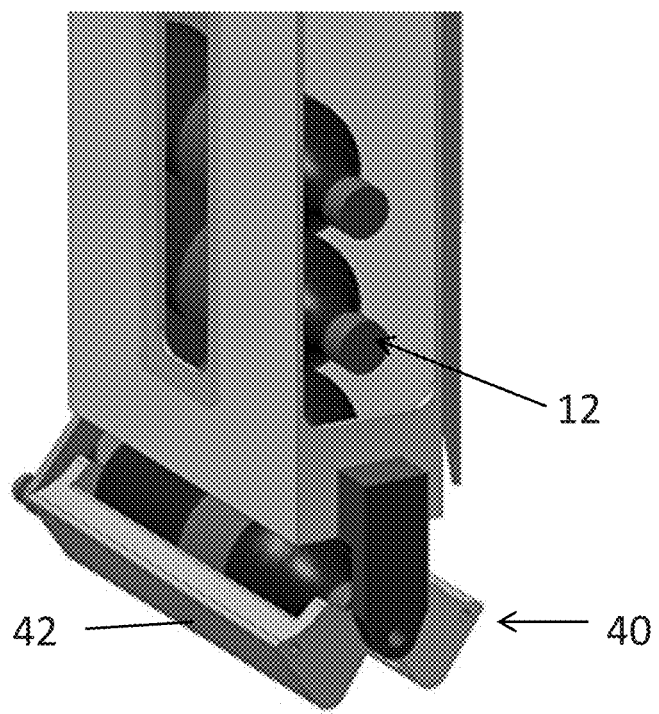
FIG. 6A is an alternative configuration of the escapement shown in FIG. 5B.

FIG. 6A shows another escapement 40 that is designed to dispense horizontally oriented beverage bottles or cans. Here, jaws 42 are spaced closer together relative to the jaws 42 in FIG. 5B so as to accommodate items 12 with a relatively smaller width. However, the escapement 40 functions as described above in relation to FIG. 5B.

Figure 6B:
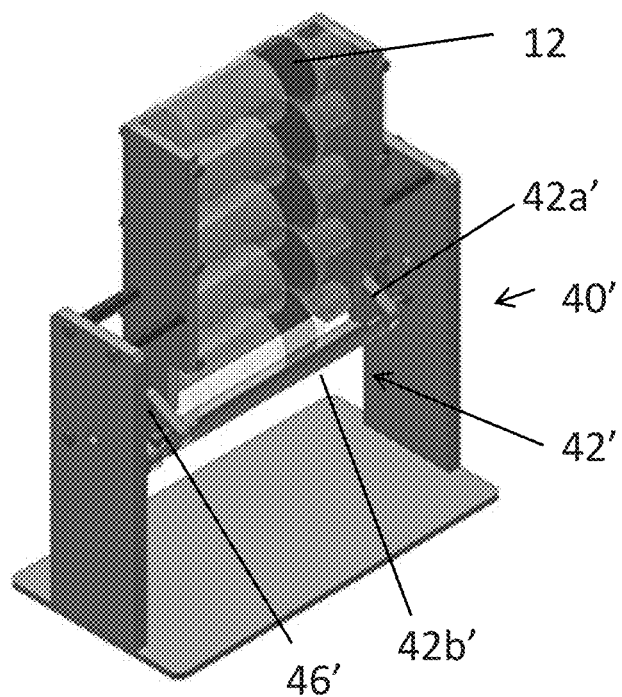
FIG. 6B is yet another alternative configuration of the escapement shown in FIG. 5B.

FIG. 6B shows an alternate design of an escapement 40' that has a single jaw 42' and a single linkage (not shown). Similar to escapement 40, when dispensing an item 12, such as an item with a rounded bottom, the actuator engages the linkage so as to rotate the jaw 42' about pivot 46'. Prior to actuation of the linkage, the bottom item 12 of the stack of items is retained by jaw 42'. When the linkage is activated, lower portion 42b' of jaw 42' pivots outward, away from item 12, such that bottom item 12 is released from the stack. As lower portion 42b' of jaw 42' rotates outward about pivot 46', upper portion 42a' of jaw 42' engages and supports the item 12 that is above the bottom item 12 being released so as to temporarily support the remaining stack. When the actuator is de-energized jaw 42' rotates to its original position, supporting the remaining items in the stack. The rotation of jaw 42' may be sufficiently quick such that the lower portion 42b' of the jaw 42' is rotated into position to catch and support the stack of items 12 such that the new bottom item 12 is in the position that was previously occupied by the dispensed item 12.

Figure 7:
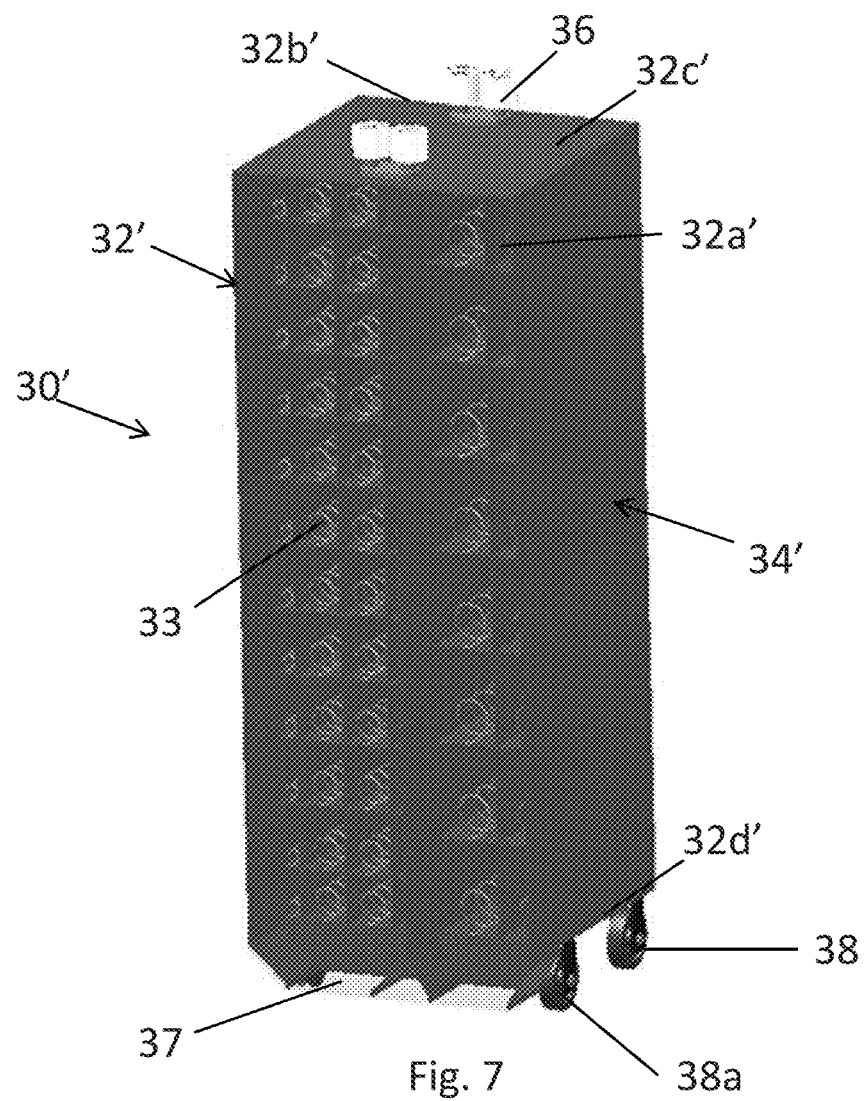
FIG. 7 is a portion of the transportable system shown in FIGS. 1-3, showing a second dispensing cart.
Figure 8:
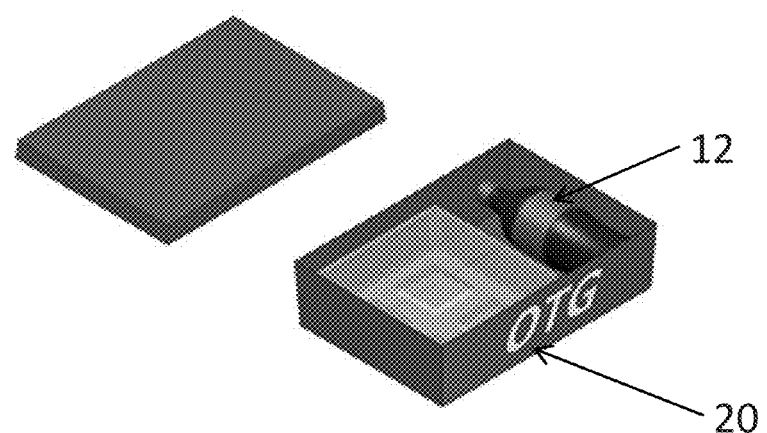
FIG. 8 is one of the boxes shown in FIGS. 3 and 4.

FIG. 7 depicts another configuration of the cart described above: cart 30'. Cart 30' includes a body 32' having a frame 34' that supports items 12 in a horizontally disposed configuration. For example, cart 30' may include augers 33 or similar devices, such as cleated conveyor belts (not shown). Items 12 may be placed within coils of the augers 33 or cleats of the conveyor belts. When actuated, one item 12 is released and dropped into the collection chute 37 for deposit into a box 20. Cart 30' may optionally include doors (not shown) disposed on the front surface 32a' and/or the rear surface 32b' of the body 32' to provide access to an interior of body 32' in order to restock items 12.

Preferably, cart 30' holds smaller items, such as single serve or snack-sized foods and small items (such as over-the-counter medications, grooming items, consumer electronic items, and the like) in a horizontal or near horizontal configuration. Augers 33 may be actuated by electric motors that are affixed to the cart (that is, are moveable with the cart). Electric power can be supplied from an electrical system in truck 14, by a battery system on each cart, or other means.

Similar to cart 30, cart 30' has a set of rollers 36 disposed on a top surface 32c' of the body 32'. Rollers 36 may be casters that are fixed to the top surface 32c' by rivets. As described above, rollers 36 are configured to mate with at least one top rail 80 (shown in FIG. 4) that is fixed to truck 14. For example, rollers 36 have a generally cylindrical shape and spin freely about rivets attached to the cart. Top rail 80 defines a recess configured to fit rollers 36 such that rollers 36 can freely spin within the recess of the rail, while lateral movement of the cart 30 is minimized by the rail. As indicated above, the present invention is not intended to be limited to any particular guide system, but rather encompasses a system in which rollers are located on the truck for guiding a rail on the top of the cart, or any other type of guidance and registrations system, including sliders, V-grooves, channels, and the like.

Cart 30' also has a set of wheels 38 disposed on a bottom surface 32d of the body 32. For example, the set of wheels 38 may include four wheels, at least two of which each have a groove 38a. FIG. 7 depicts that the front two wheels of cart 30 have a groove 38a. As described above, the grooved wheels 38 are configured to mate with at least one bottom rail 82 (shown in FIG. 4) that is fixed to the truck. For example, wheels 38 define a V-shaped groove that matches a V-shaped protrusion on bottom rail 82 such that the V-shaped groove on the wheel 38 rotates along the V-shaped protrusion on the rail 82. The interface of the V-shaped groove and the V-shaped protrusions minimizes lateral movement of the cart 30. While each wheel of the set of wheels 38 may include a groove 38a, some of the wheels may be flat (i.e., not including a groove). For example, FIG. 7 depicts that the rear two wheels 38 of cart 30 are flat. As described in further detail below, the flat wheels 38 are configured to roll against surface 84 affixed to the truck 14 and configured to correspond to the flat wheels. In this regard, the wheels 38 and cooperating structure in truck form a registration system. The present invention is not limited the registration system disclosed herein, but rather encompasses any structure and combination of structure.

In this regard, the guide system on the top of the cart and the registration system on the bottom of the cart enable registration of cart 30' into a predetermined position in truck 14 relative to conveyor 60. Other guidance and registration systems are contemplated.

Because vertical cart 30 and horizontal cart 30' have different aspect ratio, it is preferred that the carts either that a common horizontal dimension, such as cart width, or that the dimensions (for example, width) of one cart be a multiple of the other type of cart. For example, the length of cart 30' may be twice that of cart 30 (including mating gaps and within normal tolerances) so that either one cart 30' or two carts 30 may be employed in the designated space.

Figure 9:
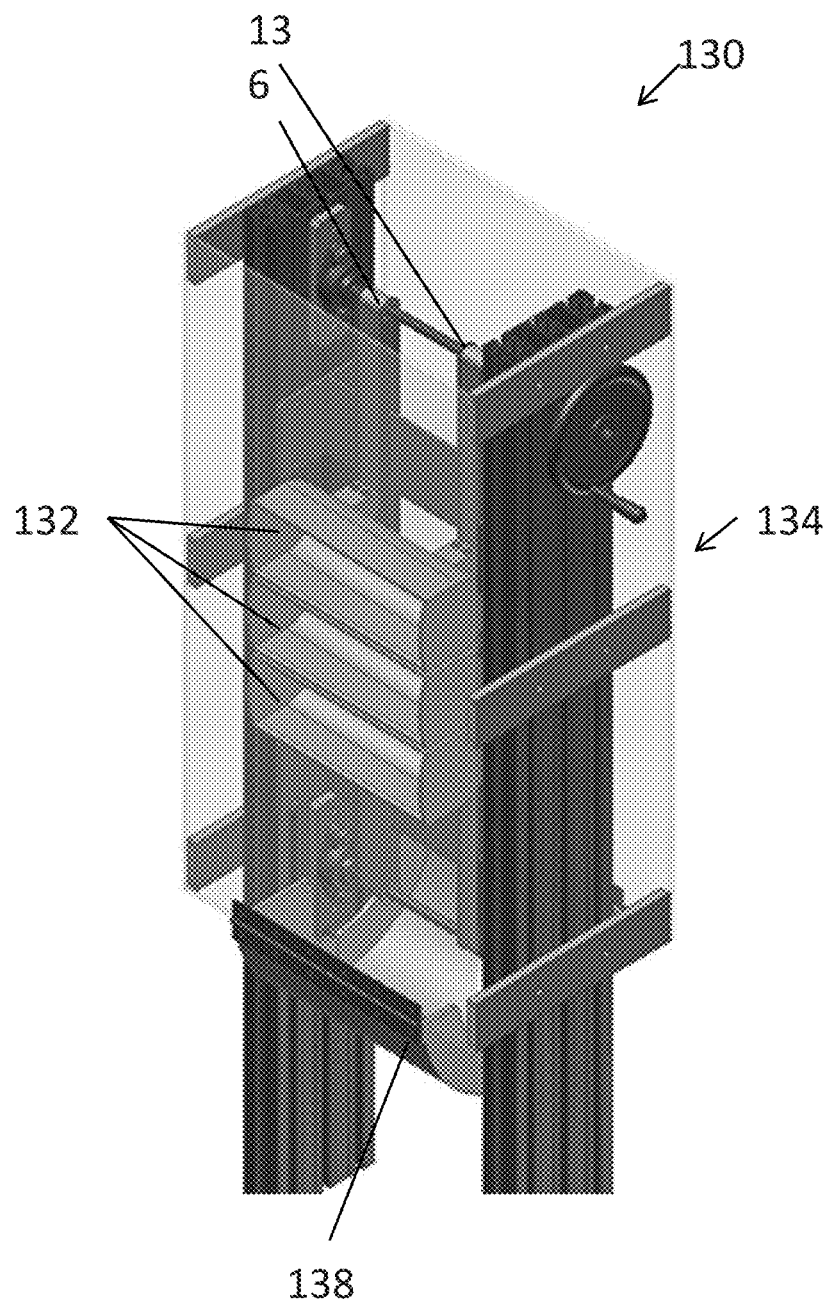
FIG. 9 is a portion of the transportable system shown in FIGS. 1-3, showing a third dispensing cart.

FIG. 9 shows yet another cart 130 that stores the items 12 horizontally in a vertical carousel configuration. Specifically, items 12 are placed in the carousel cells 132. Carousel cells 132 rotate about a frame 134 on at least one belt 136. When an item 12 is selected, the carousel cell 132 in which the selected item 12 is disposed is rotated about frame 134 until cell 132 is adjacent to a pair of doors 138. Item 12 is then released from the cell 132 and doors 138 rotate to release item 12 into box 20.

Because cart 130 is configured such that items 12 can rotate into a dispensing position, items 12 can be recirculated about frame 134 such that the entire dispensing systems does not have to process the same item 12 which increases inventory flexibility. Also, cells 132 may be configured to store and dispense items 12 having shapes that are not easily stored and released by carts 30, 30', 130. For example, yogurt or wrapped sandwiches may not be easily stored and released by carts 30, 30', 130. Additionally, cart 130 may allow gentle placement of items 12 into the box 20. Gentle placement may be important for items 12 such as plastic bottles that tend to bounce when dropped. Cart 130 may include rollers 36 and wheels 38 similar to those described in relation to carts 30, 30'.

FIGS. 10A-10C depict another cart 230 that stores and supports items 12 vertically by vertically oriented augers 233 or similar devices, such as cleated conveyor belts (not shown). Items 12 may be placed within coils of the augers 233 or cleats of the conveyor belts such that items 12 are not stacked on top of one another. In other words, the augers 233 separate items 12 such that as the augers 233 rotate, individual items 12 are dispensed. The augers 233 are timed to a common motor through a drive train (not shown). Support walls 232 are used to stabilize the stored items 12. Items 12 are loaded from one side through a door (not shown) which is normally closed.

Figure 11A:
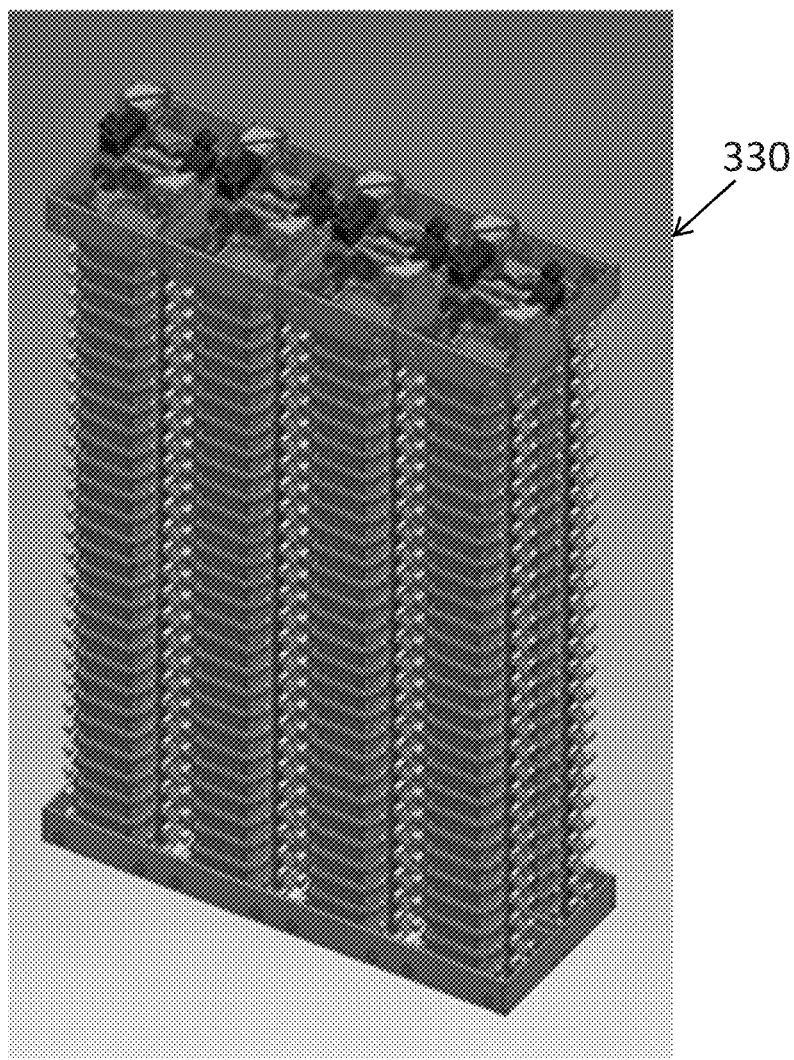
FIG. 11A is a portion of the transportable system shown in FIGS. 1-3, showing a fifth dispensing cart.
Figure 11B:
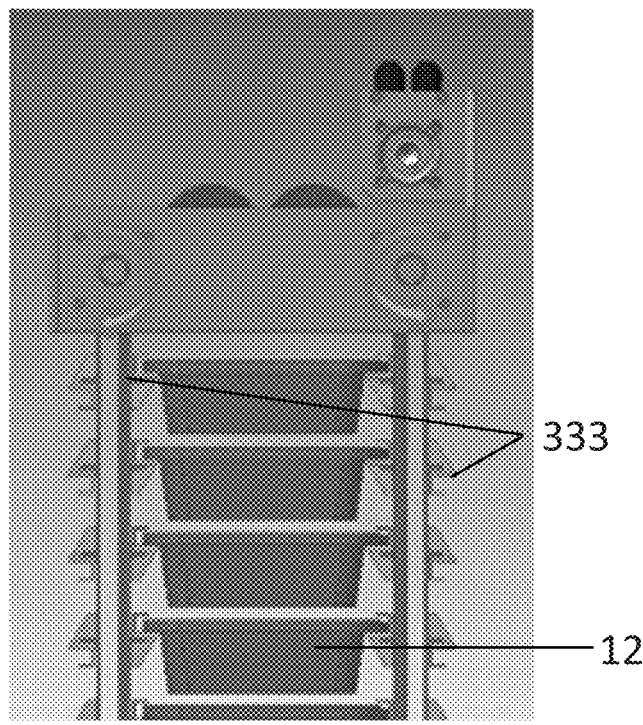
FIG. 11B is a portion of the fifth dispensing cart shown in FIG. 11A.
Figure 11C:
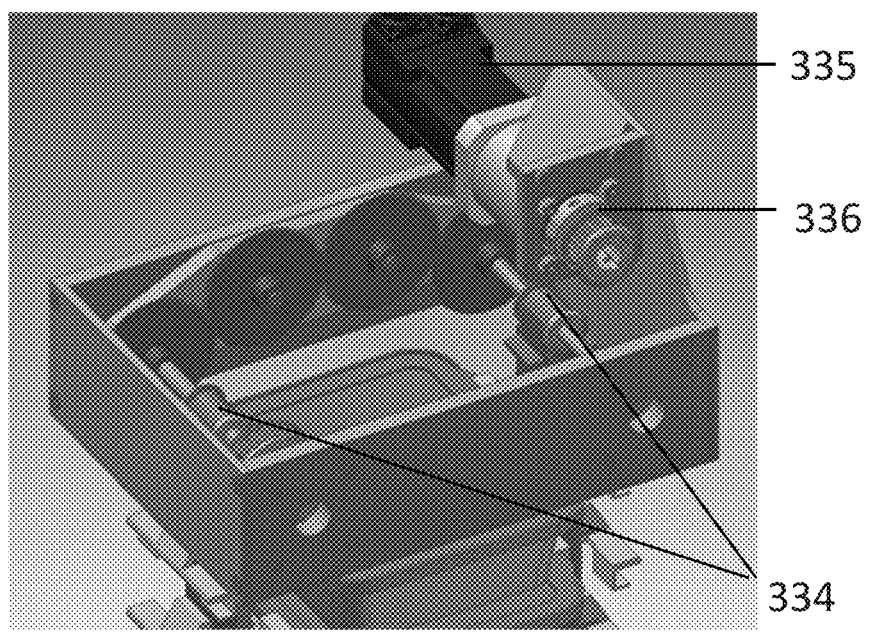
FIG. 11C is a portion of the fifth dispensing cart shown in FIGS. 11A and 11B.
Figure 12:
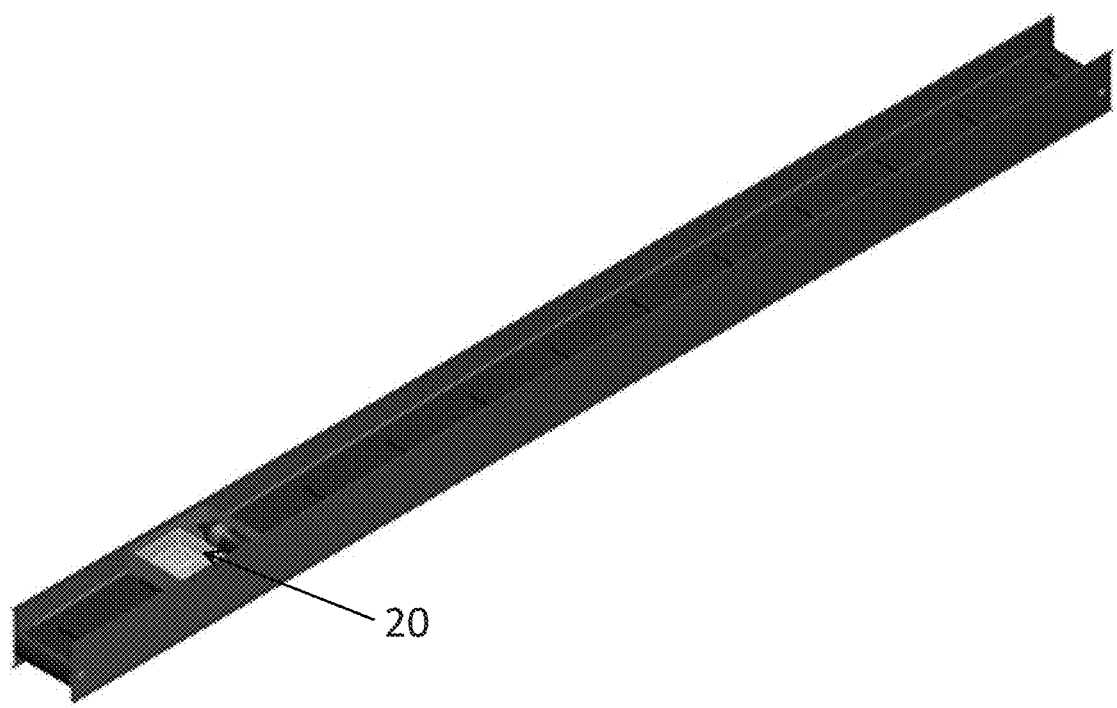
FIG. 12 is a portion of the conveyor system shown in FIGS. 3 and 4.
Figure 13:
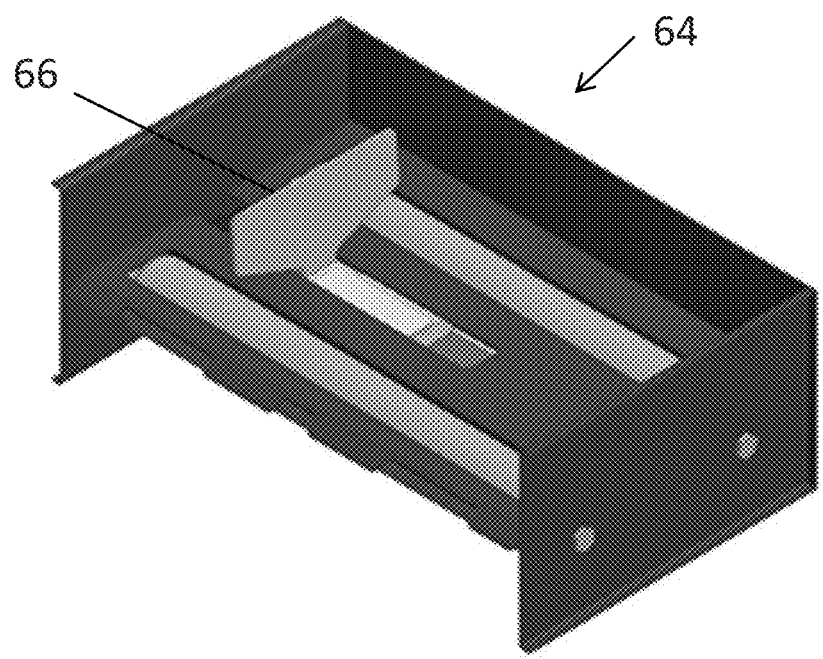
FIG. 13 is another portion of the conveyor system shown in FIGS. 3 and 4.
Figure 14:
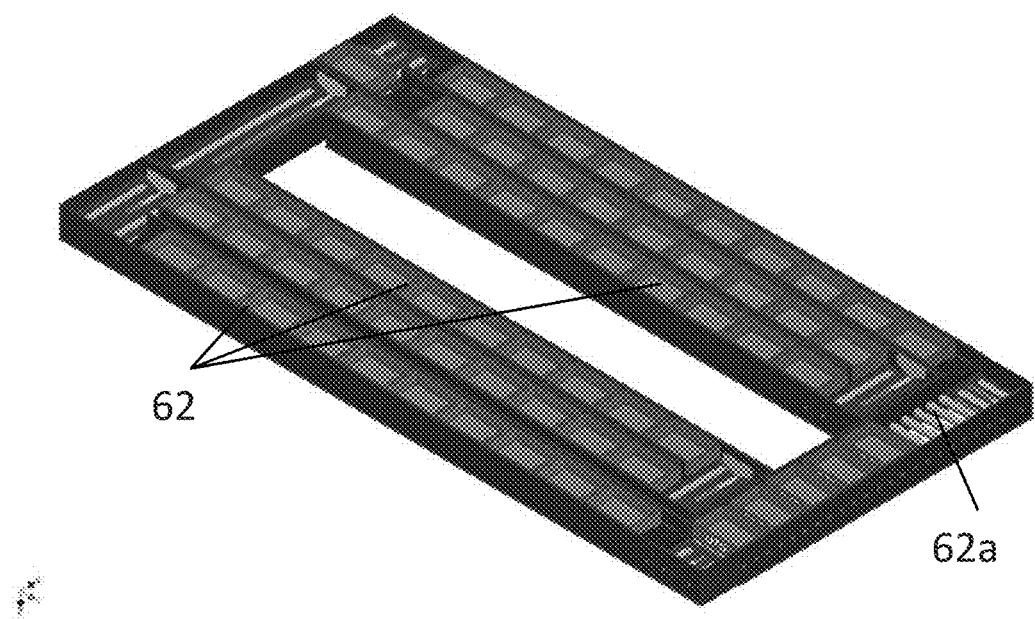
FIG. 14 is an alternative configuration of the conveyor system.

FIGS. 11A-11C depict another cart 330 that stores and supports items 12 vertically by clips 333 mounded to timing belts 334. The clips 333 and timing belts 334 separate the items 12 so that items 12 are not stacked on top of one another. As clips 333 and timing belts 334 individual items 12 are dispensed from the bottom of the cart 330. The clips 333 and timing belts 334 are positioned on opposite sides of the items 12 such that the items are stabilized. This configuration also allows items to be loaded from one of the sides (not shown) that is not proximate the timing belts 334. The timing belts are timed to a common motor 335 through a drive train 336.

With reference again to FIG. 3, box dispenser 50 may be configured to dispense one or multiple sizes of boxes. For example, box dispenser 50 may have three sizes of boxes: small (6"×9"×3.5"0, medium (9"×9"×3.5"), and large (12"× 9"×3.5"). Each size box may be nestable to conserve space. Each box preferably is configured to have regions or receptacles that match or correspond to the shapes and sizes of the items such that each item has a designated or designed place in the box.

Prior to filling each box 20 with items 12, box dispenser 50 first prints a customized label for each box 20 using a printer (not shown). The custom label may include information such as the customer's name, the customer's seat number, and/or a list of contents of the customized order. Box dispenser 50 receives this information via control system 100. The label is then affixed to the box 20 and the box is placed on a portion of the conveyor system 60 proximate the box dispenser.

Figure 4:
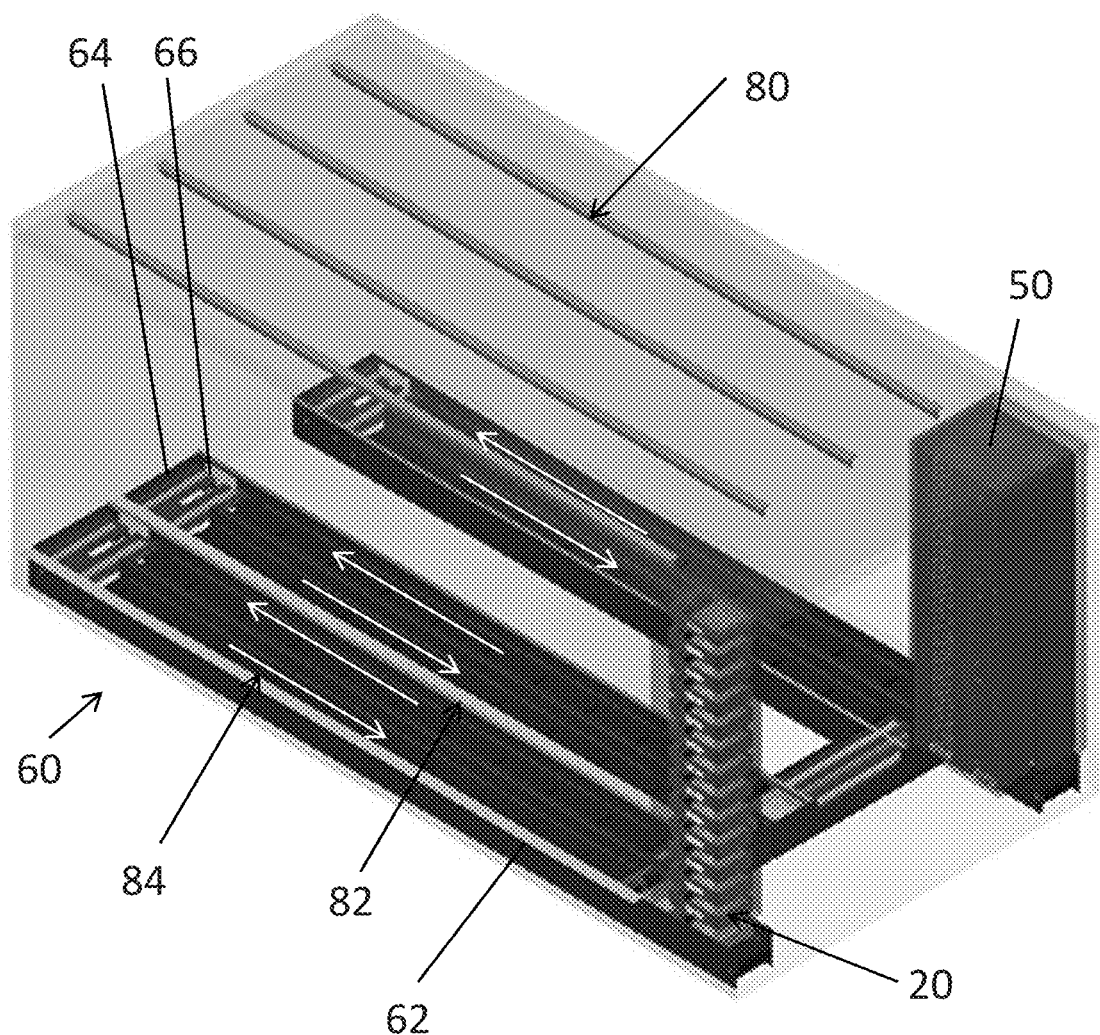
FIG. 4 is a portion of the transportable system shown in FIGS. 1-3, showing the box dispenser, boxes, and the conveyor system.

With reference to FIGS. 4, 12, 13, and 14, conveyor system 60 includes conveyor belts 62 and right angle transfers 64. As shown in FIG. 4, truck 14 has six conveyor belts 62. Four conveyor belts 62 are disposed on one side of the truck and two conveyor belts 62 are disposed on the other side. Alternatively, with reference to FIG. 14, truck 14 has three conveyor belts 62 disposed on either side. Conveyor belts 62 rotate in opposing directions, such that a first conveyor belt on the far side of the truck rotates in a first direction while the conveyor belt 62 proximate the first belt travels in the opposite direction. Right angle transfers 64 work in conjunction with conveyor belts 62 to create a continuous path from box dispenser 50 to end location 70. Right angle transfers 64 that transfer between the two sets of conveyor belts 62 on either side are configured to operate along a longer distance than the right angle transfers 64 between belts 62 directly proximate each other. Specifically, with reference to FIG. 13, right angle transfer 64 includes a pushing bracket 66 that pushes boxes 20 from a first conveyor belt 62 to a second conveyor belt 62. Pushing bracket 66 may be located at a discharge end of one conveyor belt 62 and an input end of an adjacent conveyor belt 62. Pushing bracket 66 may be actuated using a rodless air cylinder. Conveyor belts 62 and right angle transfers 64 are actuated by actuators which are powered through truck 14.

Conveyor belts 62 work in conjunction with right angle transfers 64 to circulate boxes 20 underneath carts 30, 30', 130 so that items 12 in carts 30, 30', 130 may be deposited in the boxes. Control system 100 controls actuation of the conveyor system 60 and carts 30, 30', 130 so as to coordinate transfer of items 12 from carts 30, 30', 130 into boxes 20. For example, control system 100 may pause actuation of a conveyor belt 62 when a box 20 is located underneath a cart 30, 30' that has an item 12 that should be transferred to the box. Control system 100 may further be configured to dispatch/release the appropriate size box 20, know the locations of the dispensing carts 30, 30', 130 and the locations of the items 12 within the carts, and process orders in sequence based on seat position.

After filling a box 20 with a customized order, conveyor system 60 deposits box 20 at the end location 70. End location 70 may be disposed at the rear of truck 14 so as to be accessible to an operator of the transportable system 10. The operator may then manually remove boxes 20 from the truck 14 for placement at the service point 18. For example, the operator may manually remove boxes 20 from the truck 14 and deliver them to pre-assigned airline seats.

While carts 30, 30', 130 and box dispenser 50 are configured to assemble multiple customized boxes 20, each of these components will eventually need to be restocked. As described above, rollers 36 and grooved wheels 38 on the carts 30, 30', 130, in combination with rails 80, 82 on the truck 14, minimize lateral movement of the carts 30, 30', 130 within the truck 14. Rollers 36 and grooved wheels 38 also provide for carts 30, 30', 130 to be removably secured within truck 14 because carts 30, 30', 130 can be rolled out from truck 14 along rails 80, 82. Carts 30, 30', 130 can be rolled out of truck 14 using ramps (not shown). Carts 30, 30', 130 are then replaced by other stocked carts 30, 30', 130 or restocked before being reloaded onto truck 14. Similarly, box dispenser 50 may be removed from truck 14 and replaced, or removed, restocked, and reloaded. Alternatively, box dispenser 50 may be restocked while it is disposed on truck 14.

Figure 15:
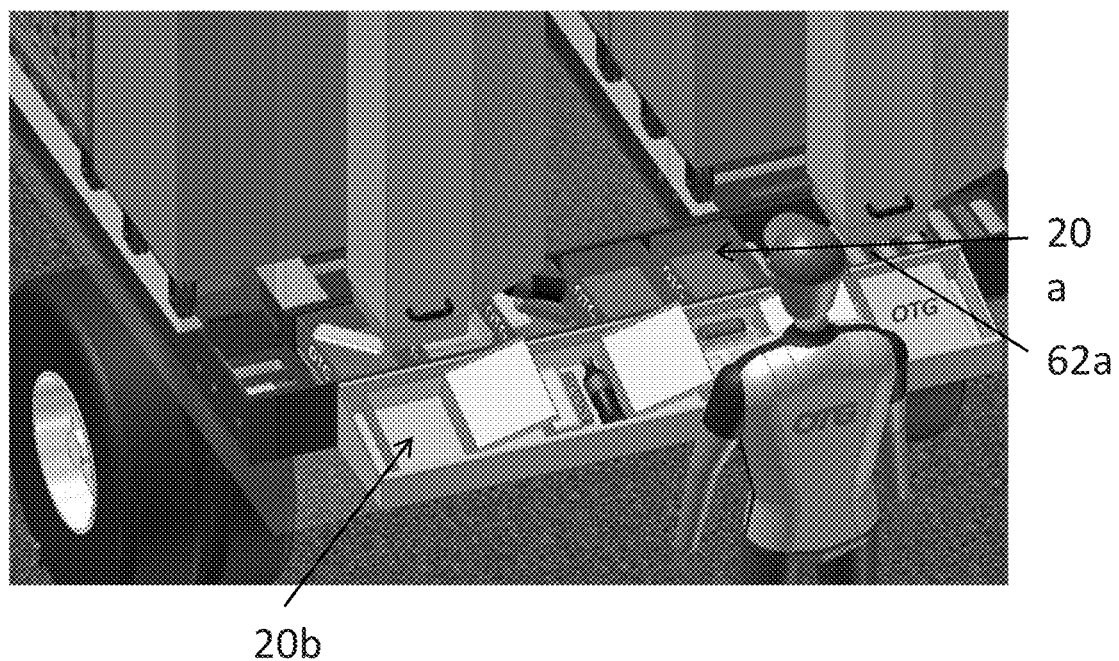
FIG. 15 is a portion of an alternate configuration of the transportable system with the conveyor system shown in FIG. 14.

With reference to FIG. 15, in some embodiments, items 12 will be collected in a box 20a that recirculates in the conveyor system 60 via on of the conveyor belts 62a which forms a recirculating track. In other words, recirculating box 20a is not removed from the conveyor system 60. Recirculating box 20a may be designed specifically for automation and the delivery box 20b can be designed specifically for presentation to the customer. Also, these embodiments have an additional conveyor belt 62 that connects the beginning of the conveyor system 60 to the end. This additional conveyor may also be where the operator collects items 12 and places them into the delivery box 20b. In some embodiments, the box dispenser 50 may be omitted because recirculating box 20a is not stacked. Designing the recirculating box 20a only for automation may improve the reliability of the system 10.

In the embodiment shown in FIG. 15, the operator either (1) removes the ordered items 12 from the recirculating box 20a and places them into a separate box 20b or bag for delivery; or (2) placed the recirculating box 20a directly into the delivery box 20b or tote. After items 12 are disposed in the delivery box 20b, the operator will remove the delivery box 20b and place them on the passenger seats.

EXAMPLE

Customer 1 clicks a button on an airline web page when he checks in to his flight 12 hours before boarding at his home computer. From a menu linked to control system 100 he chooses a canned cola A, a wrap P, and a snack bag type X (for example, potato chips). Customer 2 from her smart phone on the way to the airport orders from an app that is linked to control system 100 and chooses a bottle of water B, a salad Q, and portable headphones Y. Customer 3 from a tablet computing device owned and operated from an airport restaurant, which tablet is linked to control system 100, a few minutes before boarding orders a bottled beverage C, two sandwiches R, and two single-serve snacks Z.

Carts 30, 30', 130 may be loaded with a standard charge of food, beverage, and non-food items 12, which includes some items 12 from each item listed on the menu. Alternatively, the choice and location of the items 12 loaded onto the carts can be chosen by control system 100 according to pre-orders, such as the order from Customer 1, plus some extra items 12 for late orders.

Regardless how the food, beverage, and non-food items are chosen, carts 30 and 30' are rolled or otherwise loaded into truck 14 in way that control system knows the location and identity of every item in the vertical stack and the horizontal array. Filling of customer 1's order may occur during transit, if the truck is enabled to preform dispensing and boxing during transit, or may be may occur upon truck 14 reaching the service point 18 just outside the plane. In this regard, a box is dispensed onto the conveyor system and then conveyed to the appropriate carts from which items A, B, and C are dispensed. Because A, B, and C are moderately sized items, a small size box may be employed. Because small box 20 has a place for each item, the beverage can is dropped into a designated beverage can receptacle having for example upstanding walls internal to box 20, and the wrap P and snack bag X are dropped into a general receptacle spaced apart from the beverage can receptacle. The box for customer 1's order is conveyed under all the carts in the truck, but because most of the carts do not contain either item A, P, or X at the ejection point, the escapement for the cart is not activated until the box is at the correct position to receive the desired item A, P, or X. Then, the box is conveyed to a discharge station. Preferably, the box is label at the beginning of the boxing process, but the labeling may occur at the discharge station, or labeling may occur at each station.

Customer 2 has provided less lead time than customer 1, but the Customer 2's order is received while truck 14 is at the commissary, so choice or products and loading of the carts is the same for Customer 2 as for Customer 1. Customer 2's order is processed immediately after Customer 1's order, such that the box for customer 2 is immediately behind, or even may be in contact with, the box for Customer 1, even though Customer 2's order may require medium or large box. In this way, numerous additional orders may be processed.

Customer 3's order is received while truck 14 is en route between the commissary and service point 18. The control system receives customer 3's order, prints the label, conveys the appropriate size body for items C, R, and Z, and dispenses each into the appropriately sized region or receptacle of the box. Moreover, processing of the orders can be chronological in order of receipt, but control system 100 may also arrange the orders to assure that each choice of item is available at a discharge point, as there are a limited number of discharge points available on truck 14.

Upon completion, the lid for each box is closed either automatically or by a person. Preferably, the boxes are stacked to enable a person to carry or otherwise transport a group of boxes onto the plane or other destination. While the person is transporting a first group of boxes, the ordering system 10 continues to operate to process orders and delivery boxes to the discharge station.

When the order for an entire plane (or the like) is complete, truck 14 may go to another airline gate for fulfilling another set of orders, or may go back to the commissary. For the latter, carts 30 and 30' are disengaged from truck 14, rolled or otherwise transported out of the truck, and then the carts are refilled either with standard items or items that are chosen by the control system in located dictated by the control system.

Aspects of the present disclosure and its advantages have been described, but the present invention is not limited to any aspect or advantage unless expressly set out in the claims.

What is claimed:

1. A transportable cart for storing items, the transportable cart being adapted to receive a request from a communication device to dispense at least one of the stored items, the transportable cart comprising:
   a body;
   a set of wheels disposed on a bottom surface of the body;
   a set of bearings disposed on the top surface of the body, the set of bearings being configured to guide the transportable cart into a predetermined position in a truck;
   an outlet defined by the bottom surface of the body;
   a set of carousel cells configured to hold the items and rotate about a frame so as to control passage of the items through a pair of doors disposed proximate the outlet to a location beneath the transportable cart; and
   an actuator connected to the set of carousel cells, wherein the actuator is adapted to actuate the carousel cells to selectively dispense the at least one of the stored items through the outlet based only on the request from the communication device.

2. The transportable cart of claim 1, wherein at least one wheel of the set of wheels of each of the dispensing carts define a groove that is configured to mate with at least one corresponding rail, respectively.

3. The transportable cart of claim 1, wherein the set of bearings is configured to roll against at least one rail.

4. The transportable cart of claim 1, wherein the set of bearings includes a pair of rollers that are configured to roll against at least one rail mounted to the truck.

5. The transportable cart of claim 1, wherein the set of bearings includes opposing bearing surfaces of a rail that are configured to engage corresponding guides that are mounted on the truck.

6. A transportable system for storing items comprising:
a communication device configured to send a request to dispense at least one of the stored items;
a body;
a set of wheels disposed on a bottom surface of the body;
a set of bearings disposed on the top surface of the body, the set of bearings being configured to guide the transportable cart into a predetermined position in a truck;
an outlet defined by the bottom surface of the body;
a set of carousel cells configured to hold the items and rotate about a frame so as to control passage of the items through a pair of doors disposed proximate the outlet to a location beneath the transportable cart; and
an actuator configured to receive the request from the communication device, the actuator connected to the set of carousel cells, wherein the actuator is adapted to actuate the carousel cells to selectively dispense the at least one of the stored items through the outlet based only on the request from the communication device.

7. The transportable system of claim 6, wherein at least one wheel of the set of wheels defines a groove that is configured to mate with at least one corresponding rail.

8. The transportable system of claim 6, wherein the set of bearings is configured to roll against at least one rail.

9. The transportable system of claim 6, wherein the set of bearings includes a pair of rollers that are configured to roll against at least one rail mounted to the truck.

10. The transportable system of claim 6, wherein the set of bearings includes opposing bearing surfaces of a rail that are configured to engage corresponding guides that are mounted on the truck.

* * * * *